No. 878,642. PATENTED FEB. 11, 1908.
V. LANDHOLM.
ATTACHMENT FOR TRACTION ENGINES.
APPLICATION FILED MAY 14, 1907.
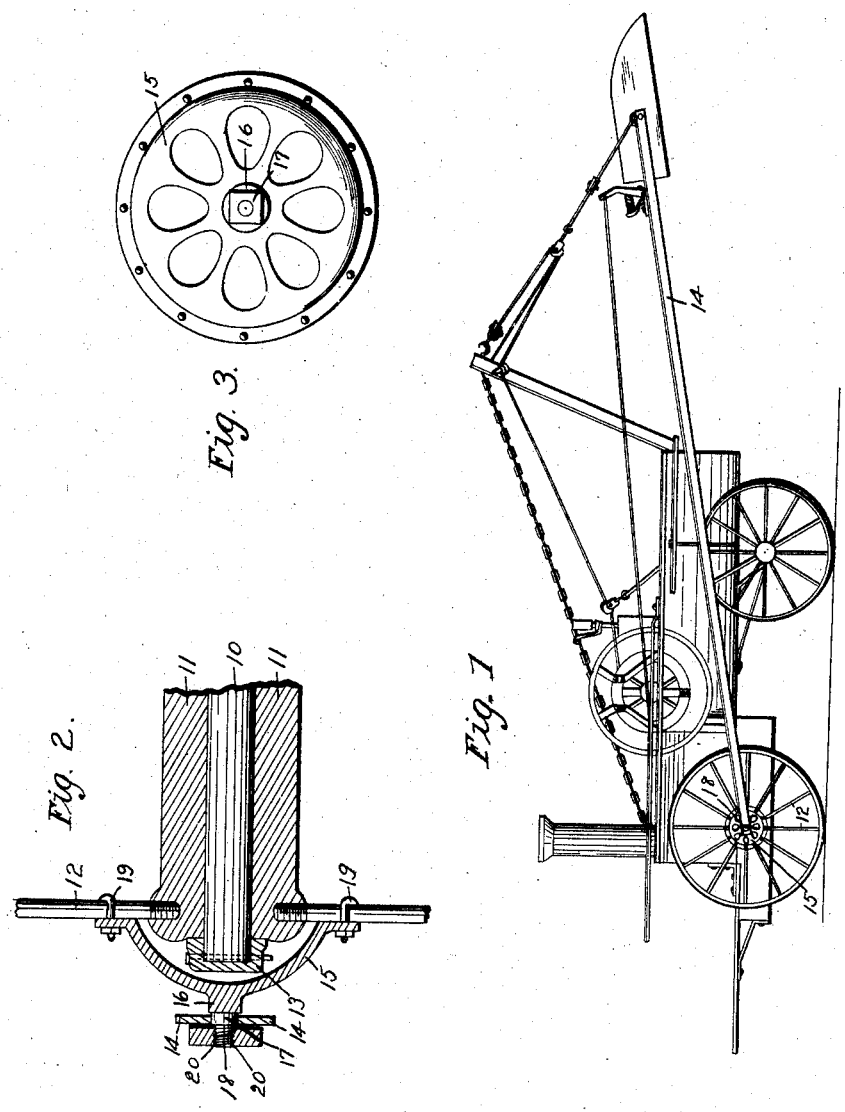
Witnesses.
F. C. Dahlberg
N. E. Bennett
Inventor.
Victor Landholm,
by Anvig & Laue Atty's

UNITED STATES PATENT OFFICE.

VICTOR LANDHOLM, OF WESTPOINT, NEBRASKA.

ATTACHMENT FOR TRACTION-ENGINES.

No. 878,642.     Specification of Letters Patent.     Patented Feb. 11, 1908.

Application filed May 14, 1907. Serial No. 373,676.

*To all whom it may concern:*

Be it known that I, VICTOR LANDHOLM, a citizen of the United States, residing at Westpoint, in the county of Cuming and State of Nebraska, have invented a certain new and useful Attachment for Traction-Engines, of which the following is a specification.

Traction engines are frequently used for the purpose of lifting weights of various kinds, and in such cases it becomes necessary to connect supporting arms with some firm and immovable part of the engine. Heretofore, it has been customary to connect these supporting arms with the rear platform of the engine, and when this was done, it was usually necessary to reinforce and brace said rear platform.

My object is to provide a device of simple, durable and inexpensive construction, to be used in the nature of an attachment that may be quickly and easily placed upon the traction wheels of the engine, said device being provided with a journal, or support, to which a supporting arm of the kind above described, may be attached to thereby dispense with the necessity of reinforcing or bracing the engine platform.

My invention consists in the construction, arrangement and combination of the various parts of the device whereby the objects contemplated are attained, as hereinafter more fully set forth, pointed out in my claims, and illustrated in the accompanying drawings, in which Figure 1 shows a side elevation of a traction engine, with a device for raising weights connected therewith, the supporting arms on said device being connected with the traction wheels of the engine by means of my improved attachment. Fig. 2 shows a detail sectional view through a part of the traction engine wheel with my improved attaching device applied thereto, and Fig. 3 shows a side elevation of the attaching device embodying my invention.

Referring to the accompanying drawings, I have used the reference numeral 10 to indicate the rear axle of a traction engine, 11 the hub of one of the traction wheels, and 12 the spokes thereof.

13 indicates a cap placed upon the axle 11 to hold the wheel hub in position.

The device for elevating loads, which is shown in Fig. 1, forms no part of my present invention, and is illustrated simply to show one way in which my improved attaching device may be used to advantage. The only part of the said load elevating device that it is necessary to consider in connection with this invention, is the supporting arm 14. I provide for attaching said supporting arm to the traction wheel as follows: The reference numeral 15 indicates the body portion of the attaching device, preferably concavoconvex in section, and circular in outline. At the center of its convex surface is a projection 16, having a rounded journal 17 thereon, and a screw threaded portion 18 beyond the journal. Formed in the periphery of the body portion 15 is a series of openings through which the bolts 19 are passed. These bolts are formed with hooks on their inner ends designed to pass around the spokes 12 of the traction wheel, whereby the device may be firmly attached to the traction wheel. The supporting arm 14 is mounted upon the journal 17 and the screw threaded part 18. In this way the arm 14 is pivotally connected to the projection 16, and held against lateral movement in either direction by the nut 20 on one side, and the projection 16 on the other. When the engine is stationary, my improved attaching device forms a very firm and rigid support for the arm 14, as the hub of the traction wheel and the rear axle are necessarily made very heavy and strong, and when it is desired to move the traction engine, it is not necessary to detach the arm 14, because the journal 17 may freely rotate within the arm 14, and not retard the progress of the traction engine.

Having thus described my invention, what I claim and desire to secure by Letters Patent of the United States, therefor, is,

1. A device of the class described, the combination of a body portion, means for detachably securing it to the wheel of a traction engine, a journal connected with said body portion to receive a supporting arm, and means for pivotally connecting the supporting arm with said journal.

2. A device of the class described, the combination of a body portion substantially concavo-convex in section, and circular in outline, a number of bolts passed through said body portion, and formed with hooks to engage the vehicle wheel spokes, a projection formed on the convex side of the body portion, and having a journal thereon, and a nut for said screw threaded portion.

Des Moines, Iowa, May 2, '07.

VICTOR LANDHOLM.

Witnesses:
 JOE T. PETERSON,
 WM. LANDHOLM.